(12) United States Patent
Asanuma

(10) Patent No.: US 11,293,745 B2
(45) Date of Patent: Apr. 5, 2022

(54) INSPECTION MASTER

(71) Applicant: ASANUMA GIKEN CO., LTD., Hamamatsu (JP)

(72) Inventor: Susumu Asanuma, Hamamatsu (JP)

(73) Assignee: ASANUMA GIKEN CO., LTD., Hamamatsu (JP)

( * ) Notice: Subject to any disclaimer, the term of this patent is extended or adjusted under 35 U.S.C. 154(b) by 0 days.

(21) Appl. No.: 17/055,451

(22) PCT Filed: Jun. 20, 2019

(86) PCT No.: PCT/JP2019/024503
§ 371 (c)(1),
(2) Date: Nov. 13, 2020

(87) PCT Pub. No.: WO2020/004222
PCT Pub. Date: Jan. 2, 2020

(65) Prior Publication Data
US 2021/0223020 A1    Jul. 22, 2021

(30) Foreign Application Priority Data

Jun. 28, 2018   (JP) .............................. JP2018-122735
Oct. 23, 2018   (JP) .............................. JP2018-199258

(51) Int. Cl.
*G01B 7/008*   (2006.01)
*G01B 21/04*   (2006.01)

(52) U.S. Cl.
CPC .......... *G01B 7/008* (2013.01); *G01B 21/047* (2013.01)

(58) Field of Classification Search
CPC ................................................... G01B 21/047
(Continued)

(56) References Cited

U.S. PATENT DOCUMENTS

| | | | | |
|---|---|---|---|---|
| 4,932,136 A | * | 6/1990 | Schmitz | G01B 3/30 33/502 |
| 4,962,591 A | * | 10/1990 | Zeller | G01B 3/30 33/502 |
| 5,313,410 A | * | 5/1994 | Watts | G01B 21/042 33/503 |

(Continued)

FOREIGN PATENT DOCUMENTS

| | | |
|---|---|---|
| JP | S60-046579 U | 4/1985 |
| JP | S62-133106 U | 8/1987 |

(Continued)

OTHER PUBLICATIONS

Aug. 27, 2019 Written Opinion issued in International Patent Application No. PCT/JP2019/024503.
(Continued)

*Primary Examiner* — George B Bennett
(74) *Attorney, Agent, or Firm* — Oliff PLC

(57) ABSTRACT

In an inspection master, an upper-surface oblique reference portion opened obliquely upward is provided on an upper surface of a master main body including the upper surface and a peripheral surface. In an inspection master, a peripheral-surface oblique reference portion opened obliquely upward is provided on a peripheral surface of a master main body including an upper surface and the peripheral surface. In either of those cases, an upper-surface vertical reference portion opened vertically can be provided on the upper surface, and a peripheral-surface lateral reference portion opened laterally can be provided on the peripheral surface. Further, a reference ball for use in obtaining an inclination angle of the master main body inclined during accuracy inspection for a five-axis processing machine is provided at a center portion of the upper surface.

6 Claims, 19 Drawing Sheets

(58) Field of Classification Search
USPC .......................................................... 33/502
See application file for complete search history.

(56) References Cited

U.S. PATENT DOCUMENTS

| | | | | |
|---|---|---|---|---|
| 6,023,850 | A | 2/2000 | Trapet | |
| 6,493,956 | B1 * | 12/2002 | Matsuda | G01B 21/042 33/502 |
| D619,481 | S * | 7/2010 | Asanuma | G01B 21/042 D10/63 |
| 8,792,709 | B2 * | 7/2014 | Pulla | G01B 21/04 382/154 |
| 9,952,044 | B2 * | 4/2018 | Gatton | G01B 21/042 |
| 10,166,644 | B2 * | 1/2019 | Kume | B23Q 17/2233 |
| 10,845,192 | B2 * | 11/2020 | Lause | B23Q 17/22 |
| 10,888,968 | B2 * | 1/2021 | Toimela | B23Q 17/20 |
| 2002/0157449 | A1 * | 10/2002 | Asanuma | G01B 21/042 73/1.79 |
| 2010/0088056 | A1 | 4/2010 | Igarashi et al. | |

FOREIGN PATENT DOCUMENTS

| | | |
|---|---|---|
| JP | 2001-311618 A | 11/2001 |
| JP | 2002-195820 A | 7/2002 |
| JP | 2003-329402 A | 11/2003 |
| JP | 2004-286457 A | 10/2004 |
| JP | 2009-133790 A | 6/2009 |
| JP | 2014-098649 A | 5/2014 |
| JP | 6419380 B1 | 11/2018 |
| JP | 6469927 B1 | 2/2019 |
| WO | 2008/105096 A1 | 9/2008 |

OTHER PUBLICATIONS

Aug. 27, 2019 International Search Report issued in International Patent Application No. PCT/JP2019/024503.

Aug. 3, 2018 Office Action issued in Japanese Patent Application No. 2018-122735.

* cited by examiner

INSPECTION MASTER

TECHNICAL FIELD

The present invention relates to an inspection master capable of performing accuracy inspection for a contact type three-dimensional measuring machine and further, accuracy inspection (measurement) for a five-axis processing machine.

BACKGROUND ART

Three-axis processing machines and five-axis processing machines have been used for processing machine parts such as an automobile engine and a transmission case. As an example of the five-axis processing machine, a five-axis machining center is given. The "five-axis" normally corresponds to five axes in total including three axes, specifically, a right-and-left axis (X axis), a front-and-rear axis (Y axis), and an up-and-down axis (Z axis) and additional two axes, specifically, a rotation axis and a turning axis.

A contact type three-dimensional measuring machine has been used for measuring dimensions of machine parts having been subjected to three-axis machining. The contact type three-dimensional measuring machine includes a spherical probe (contact element), and the probe is brought into contact with an object to be measured, which is set on a measurement table, to measure dimensions, smoothness, and the like of the object to be measured.

In order to maintain measurement accuracy, the contact type three-dimensional measuring machine is periodically subjected to inspection of the measurement accuracy with use of an inspection master finished with high accuracy. The applicant of the subject application previously developed and proposed inspection masters (Patent Literatures 1 and 2).

As illustrated in FIG. 18, in an inspection master A previously developed by the applicant of the subject application, four upper-surface measurement portions D1 serving as measurement references are provided on an upper surface C of a hollow cylindrical master main body B, and peripheral-surface measurement portions D2 serving as measurement references are provided on a peripheral surface E of the master main body B and are arranged in four rows each including two peripheral-surface measurement portions D2. A reference hole (vertical hole) F opened vertically is formed at the center of each of the upper-surface measurement portions D1, and a reference hole (lateral hole) G opened laterally is formed at the center of each of the peripheral-surface measurement portions D2.

As one of the contact type three-dimensional measuring machine, there is known a so-called "gantry type". As illustrated in FIG. 19, the contact type three-dimensional measuring machine of the gantry type includes a gantry-type movable frame H slidable in a reciprocating manner in a Y direction (front-and-rear direction), a head portion I supported by the gantry-type movable frame H and slidable in a reciprocating manner in an X direction (right-and-left direction), an elevation shaft J supported on the head portion I so as to be vertically movable in a Z direction (up-and-down direction), and a probe K at a tip of the elevation shaft J. A tip portion of the probe K is formed into a highly accurate spherical shape with a hard and abrasion-resistant material such as artificial ruby or ceramics.

When inspection of the measurement accuracy or data taking required for calibration of a measurement error is to be performed on the contact type three-dimensional measuring machine of the gantry type of FIG. 19 with use of the inspection master A of FIG. 18, as illustrated in FIG. 19, the inspection master A is set on a holder M mounted to a measurement table L of the contact type three-dimensional measuring machine of the gantry type. The probe K of the contact type three-dimensional measuring machine is brought into contact with an inner peripheral surface or a measurement reference surface N of the upper-surface measurement portion D1 or the peripheral-surface measurement portion D2 of the inspection master A to measure smoothness of the contact point and various items required for evaluation of the contact type three-dimensional measuring machine. The measured value (actual measured value) is compared with a reference value in which metric traceability is confirmed to check an error between the actual measured value and the reference value and check straightness of each axial direction in which the probe K moves, squareness between the axes, and an error in each axial direction. In this manner, the inspection for the contact type three-dimensional measurement machine itself is performed.

CITATION LIST

Patent Literature

[PTL 1] JP 2001-311618 A
[PTL 2] JP 2002-195820 A

The vertical hole F of each of the upper-surface measurement portions D1 of the inspection master A of FIG. 18 is opened perpendicularly to the upper surface C, and the lateral hole G of each of the peripheral-surface measurement portions D2 on the peripheral surface E is opened horizontally to the peripheral surface E. Thus, although the probe K can be inserted into the vertical hole F or the lateral hole G for measurement, or the probe K of the contact type three-dimensional measuring machine can be brought into contact with the measurement reference surface N to measure smoothness, measurement in a direction oblique to the axial direction of the master main body B cannot be performed. Further, in recent years, five-axis processing machines having three axes of X, Y, and Z and additional two axes of rotation and turning have been used widely, but there is no inspection master suitable for performing accuracy inspection for the five-axis processing machines.

The present invention provides an inspection master capable of performing accuracy inspection or check for a five-axis processing machine and also accuracy inspection or check for the contact type three-dimensional measuring machine.

Solution to Problem

An inspection master according to one embodiment of the present invention includes an upper-surface oblique reference portion provided on an upper surface of a three-dimensional master main body. The upper-surface oblique reference portion has a reference hole opened obliquely upward. An inspection master according to another embodiment of the present invention includes a peripheral-surface oblique reference portion provided on a peripheral surface of a master main body. The peripheral-surface oblique reference portion has a reference hole opened obliquely upward. An inspection master according to another embodiment of the present invention may include both the upper-surface oblique reference portion and the peripheral-surface oblique reference portion provided to the master main body. It is preferred that the above-mentioned inspection masters include a reference ball provided on the upper surface of the master main body.

The above-mentioned inspection masters according to the embodiments of the present invention may include an upper-surface vertical reference portion provided on the upper surface or include a peripheral-surface lateral reference portion provided on the peripheral surface. Further, the inspection masters may include both the upper-surface vertical reference portion and the peripheral-surface lateral reference portion. The upper-surface vertical reference portion has a vertical reference hole opened vertically, and the peripheral-surface lateral reference portion has a lateral reference hole opened laterally.

Advantageous Effects of Invention

The inspection master of the present invention has following effects.

(1) When the upper-surface oblique reference portion is provided to the master main body, a contact element mounted to the five-axis processing machine is brought into contact with the upper-surface oblique reference portion of the inspection master, which is being rotated and/or turned, thereby being capable of performing axis measurement of the rotation axis or the turning axis. Thus, measurement of five axes in total including three-axis measurement of an X axis, a Y axis, and a Z axis thus far can be performed, thereby being capable of also performing accuracy inspection for the five-axis processing machine.

(2) When the peripheral-surface oblique reference portion is provided to the master main body, a contact element mounted to the five-axis processing machine is brought into contact with the peripheral-surface oblique reference portion of the inspection master, which is being rotated and/or turned, thereby being capable of performing axis measurement of the rotation axis or the turning axis. Thus, measurement of five axes in total including three-axis measurement of an X axis, a Y axis, and a Z axis thus far can be performed, thereby being capable of also performing accuracy inspection for the five-axis processing machine.

(3) Even when the inspection master is rotated and/or turned, the rotation inclination angle or the turning inclination angle of the inspection master can be checked with the reference ball provided on the upper surface of the master main body as a reference, thereby being capable of performing five-axis measurement with high accuracy.

DESCRIPTION OF EMBODIMENTS

First Embodiment of Inspection Master

Figure 1A:
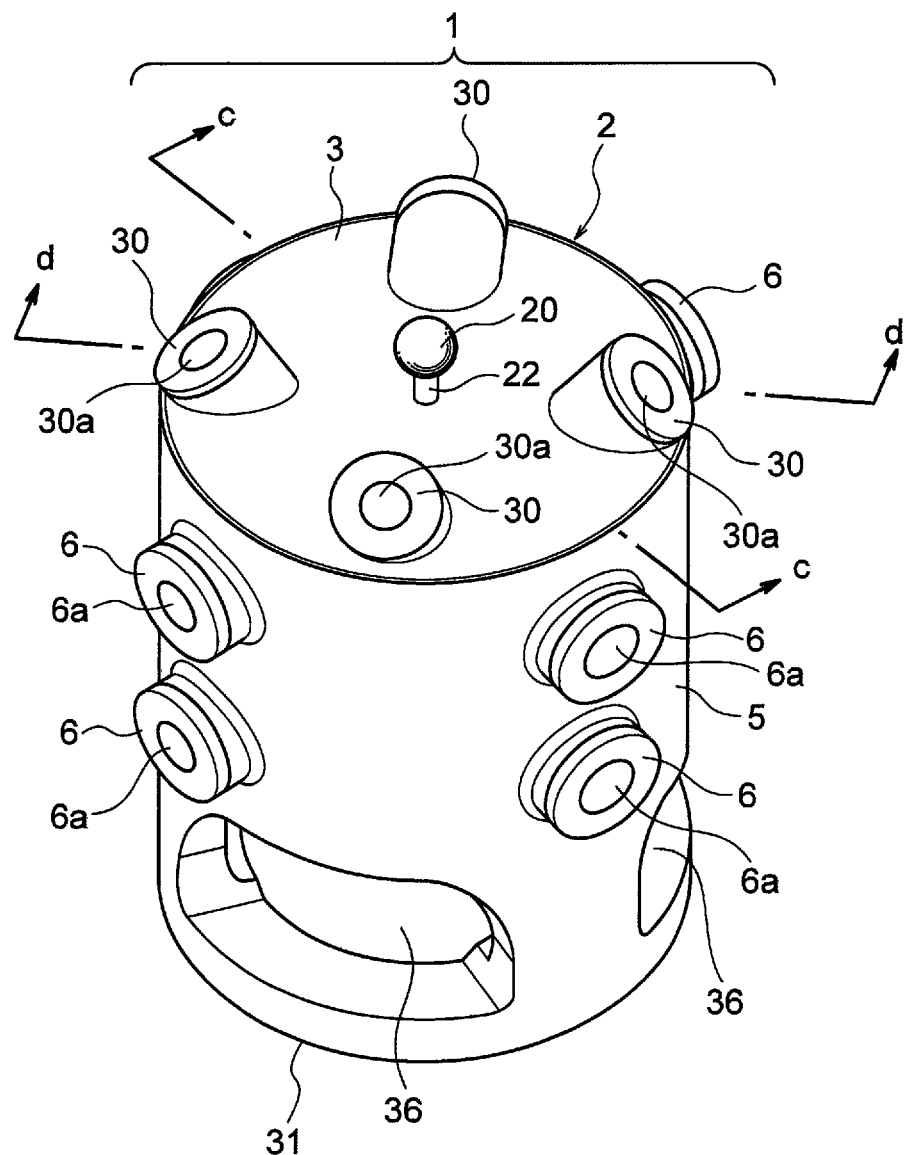
FIG. 1(a) is a perspective view for illustrating a first example of an inspection master of the present invention.

FIG. 1 to FIG. 4 are illustrations of an example of an inspection master 1 of the present invention. In the inspection master 1, four upper-surface oblique reference portions 30 and one reference ball 20 are provided on an upper surface 3 of a hollow cylindrical master main body 2, and four rows of peripheral-surface lateral reference portions 6 are provided on a peripheral surface 5 of the hollow cylindrical master main body 2. The number of the upper-surface oblique reference portions 30 may be any number equal to or more than one. The upper-surface oblique reference portions 30 extend obliquely upward, and each have an upper opening hole 30a that is opened obliquely upward. The four rows of the peripheral-surface lateral reference portions 6 are provided at intervals of 90° in a circumferential direction of the peripheral surface 5 of the master main body 2, but may be provided at other intervals. The peripheral-surface lateral reference portions 6 each include a lateral opening hole 6a that is opened laterally. The number of rows of the peripheral-surface lateral reference portions 6 may be any number equal to or more than one, and the number of the peripheral-surface lateral reference portions 6 in each row may be any number equal to or more than one. The reference ball 20 is mounted through intermediation of a shaft 22, and is away from the upper surface 3. The reference ball 20 is away from the upper surface 3, and hence, as illustrated in FIG. 17, spherical measurement probes 21 are easily brought into contact with the reference ball 20. The size of the reference ball 20 is designed to a size suitable for measurement.

Second Embodiment of Inspection Master

In an inspection master 1 of FIG. 5 to FIG. 8, four upper-surface oblique reference portions 30 that are opened obliquely are provided at four positions on an upper surface 3 of a hollow cylindrical master main body 2, and a reference ball 20 is provided at the center portion of the upper surface 3. Four upper-surface vertical reference portions 4 that are opened vertically are provided on an inner side of the upper-surface oblique reference portions 30 and on an outer periphery of the reference ball 20, and four rows of peripheral-surface lateral reference portions 6 that are opened laterally are provided at four positions in a circumferential direction of a peripheral surface 5 of the master main body 2. The number of the upper-surface oblique reference portions 30 and the number of the upper-surface vertical reference portions 4 may be any number equal to or more than one. The number of rows of the peripheral-surface lateral reference portions 6 may be any number equal to or more than one, and the number of the peripheral-surface lateral reference portions 6 in each row may be any number equal to or more than one.

Third Embodiment of Inspection Master

In an inspection master 1 of FIG. 9 to FIG. 12, four upper-surface oblique reference portions 30 are provided on an upper surface 3 of a hollow cylindrical master main body 2, and a reference ball 20 is provided at the center portion of the upper surface 3. Four rows of peripheral-surface lateral reference portions 6 that are opened laterally are provided in a circumferential direction of a peripheral surface 5 of the master main body 2, and four rows of peripheral-surface oblique reference portions 7 that are opened obliquely upward are provided between the four rows of the peripheral-surface lateral reference portions 6. Two peripheral-surface lateral reference portions 6 are provided in each row, and two peripheral-surface oblique reference portions 7 are provided in each row. However, the number of rows and the number in each row may be the number other than those described above.

Fourth Embodiment of Inspection Master

In an inspection master 1 of FIG. 13 to FIG. 16, four upper-surface oblique reference portions 30 are provided on an upper surface 3 of a hollow cylindrical master main body 2, and a reference ball 20 is provided at the center portion of the upper surface 3. Four upper-surface vertical reference portions 4 that are opened vertically are provided on an inner side of the upper-surface oblique reference portions 30 and on an outer periphery of the reference ball 20. Further, four rows of peripheral-surface lateral reference portions 6 that are opened laterally are provided in a circumferential direction of a peripheral surface 5 of the master main body 2, and four rows of peripheral-surface oblique reference portions 7 that are opened obliquely upward are provided between the four rows of the peripheral-surface lateral reference portions 6. Two peripheral-surface lateral reference portions 6 are provided in each row, and two peripheral-surface oblique reference portions 7 are provided in each row. However, the number of rows and the number in each row may be the number other than those described above.

[Master Main Body]

Figure 3A:
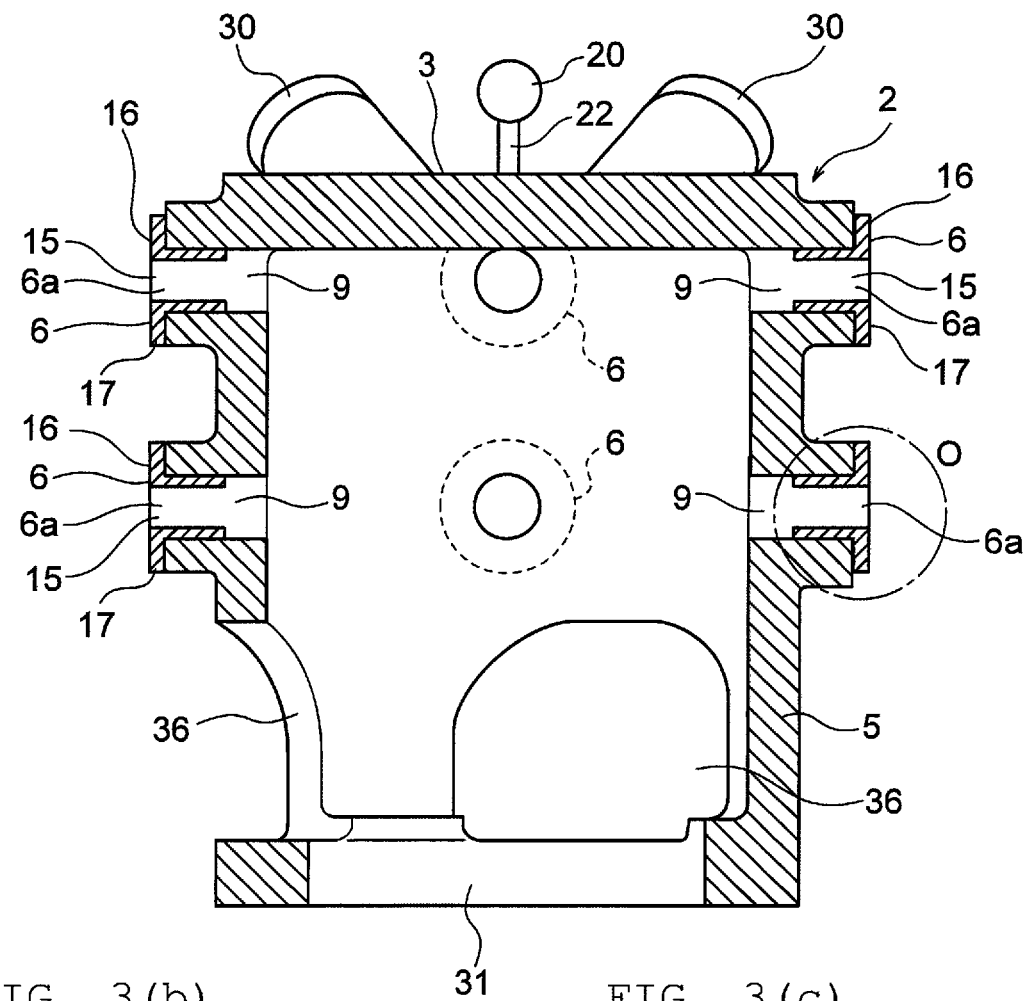
FIG. 3(a) is a sectional view taken along the line c-c of FIG. 1(a)
Figure 3B:
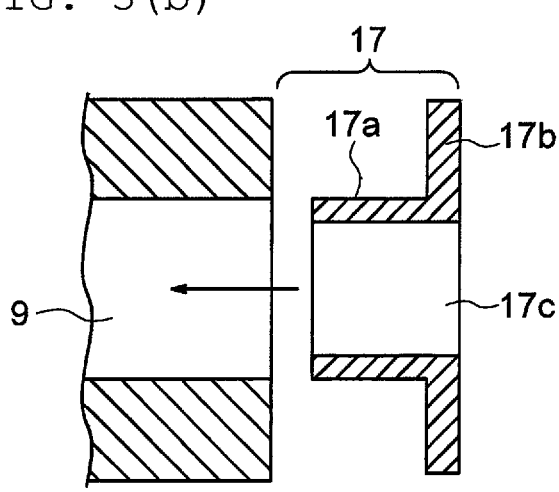
FIG. 3(b) is an explanatory view for illustrating the part O of FIG. 3(a) before a flanged bush is inserted into a peripheral-surface mounting hole of a master main body.
Figure 3C:
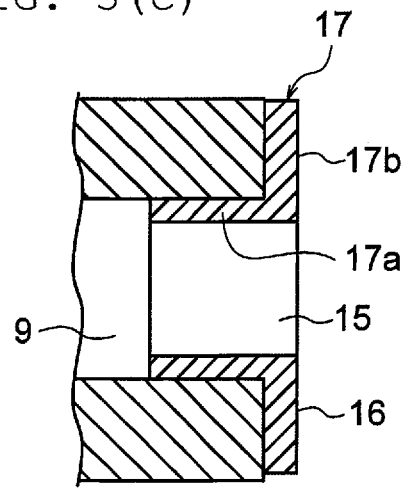
FIG. 3(c) is an explanatory view for illustrating the part O of FIG. 3(a) when the flanged bush is inserted into and fixed to the peripheral-surface mounting hole of the master main body.
Figure 4A:
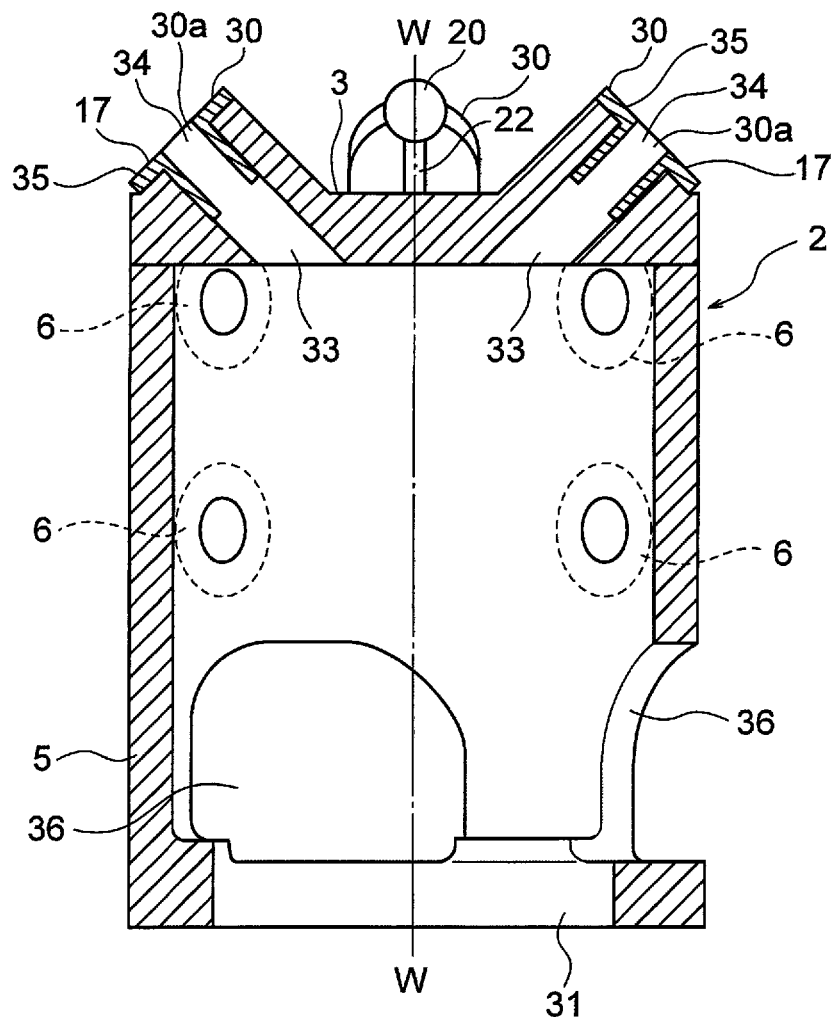
FIG. 4(a) is a sectional view taken along the line d-d of FIG. 1(a)
Figure 4B:
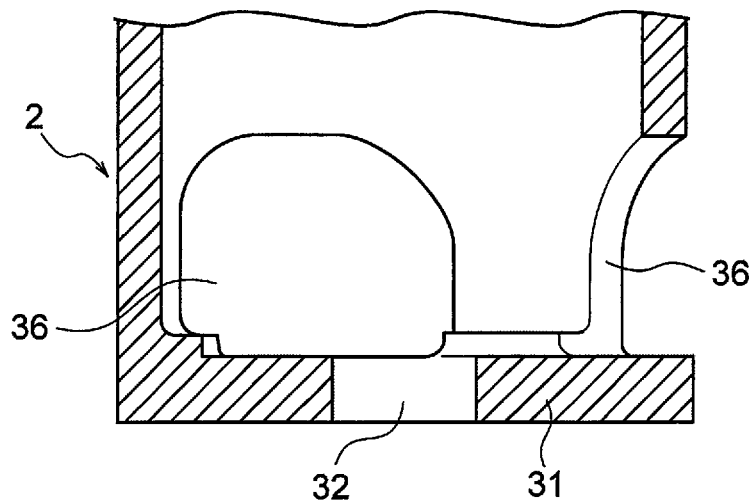
FIG. 4(b) is a sectional view for illustrating another example of a bottom surface portion of the master main body.
Figure 5:
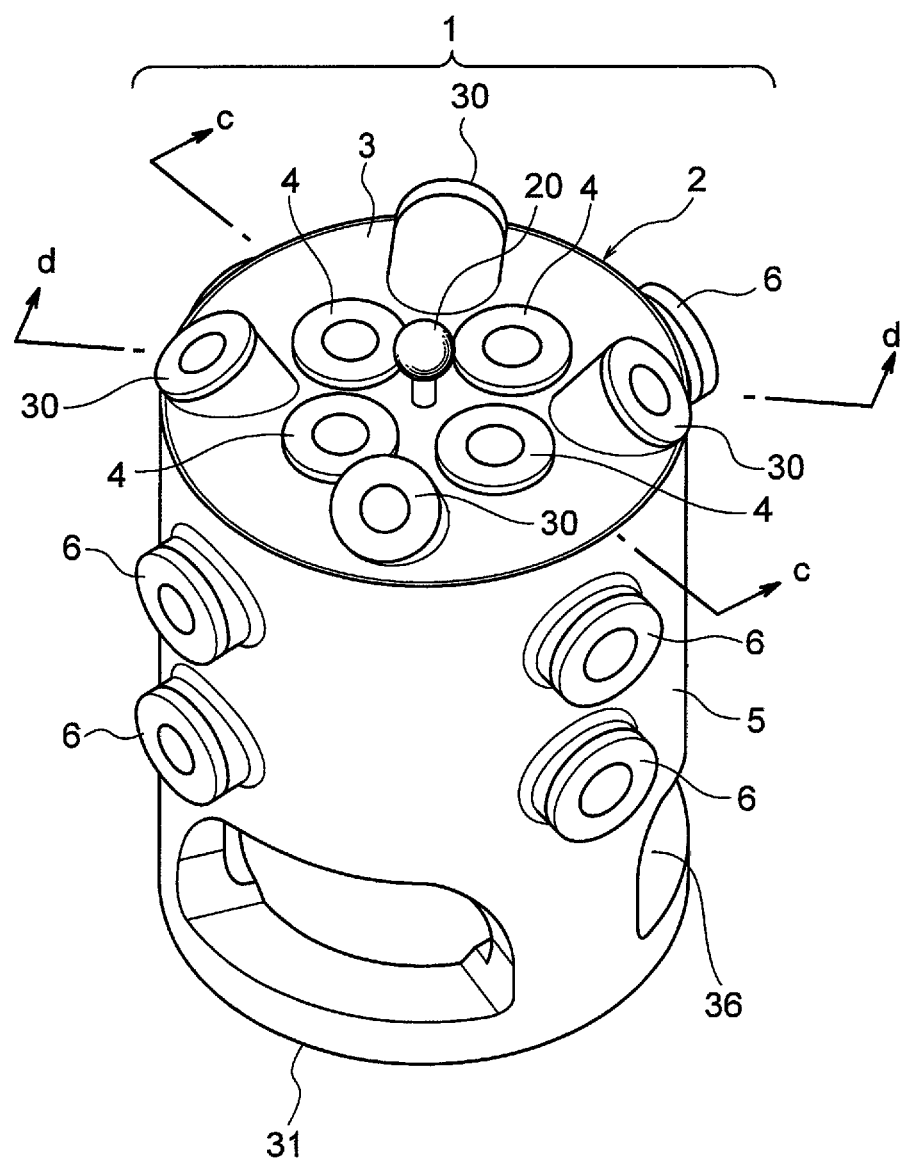
FIG. 5 is a perspective view for illustrating a second example of the inspection master of the present invention.
Figure 6:
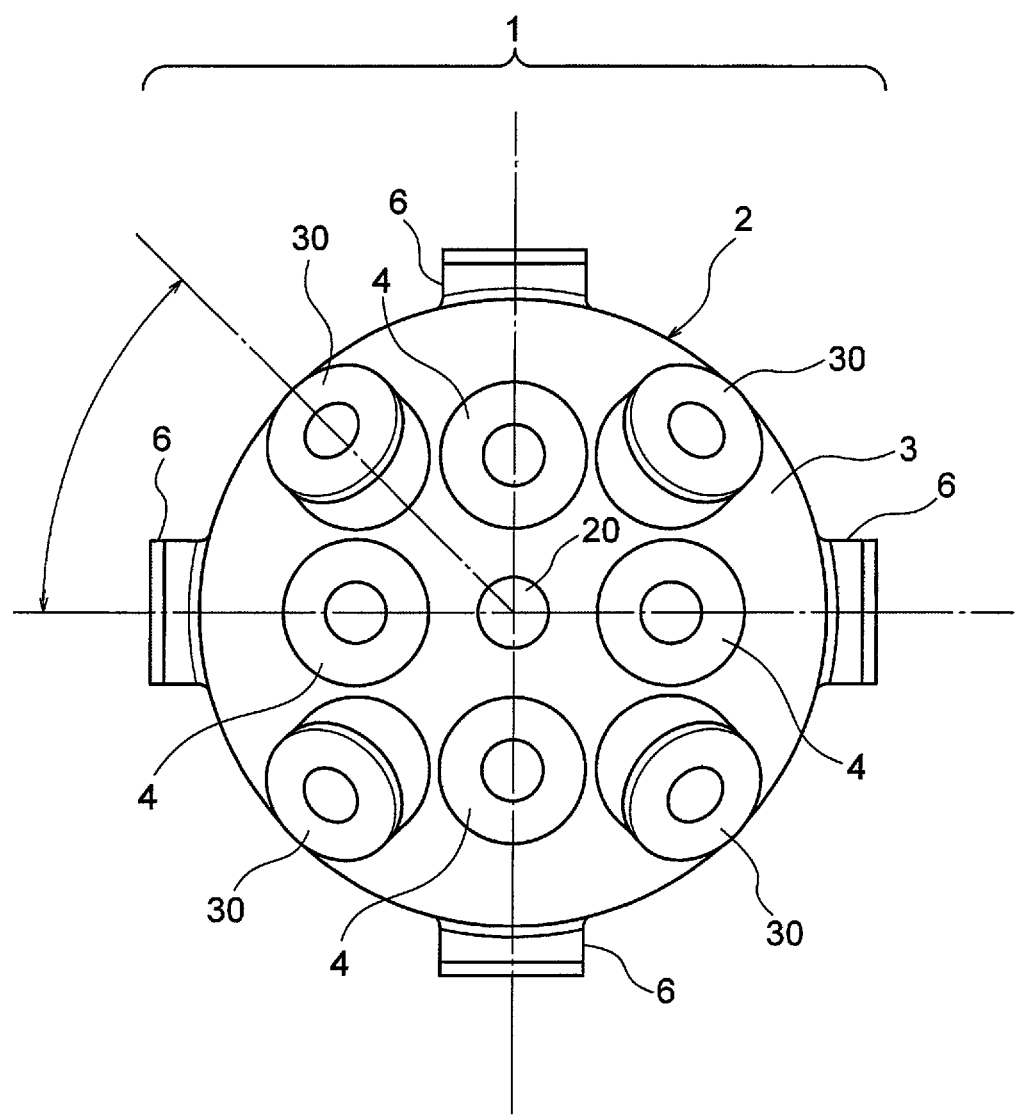
FIG. 6 is a plan view of FIG. 5.
Figure 7:
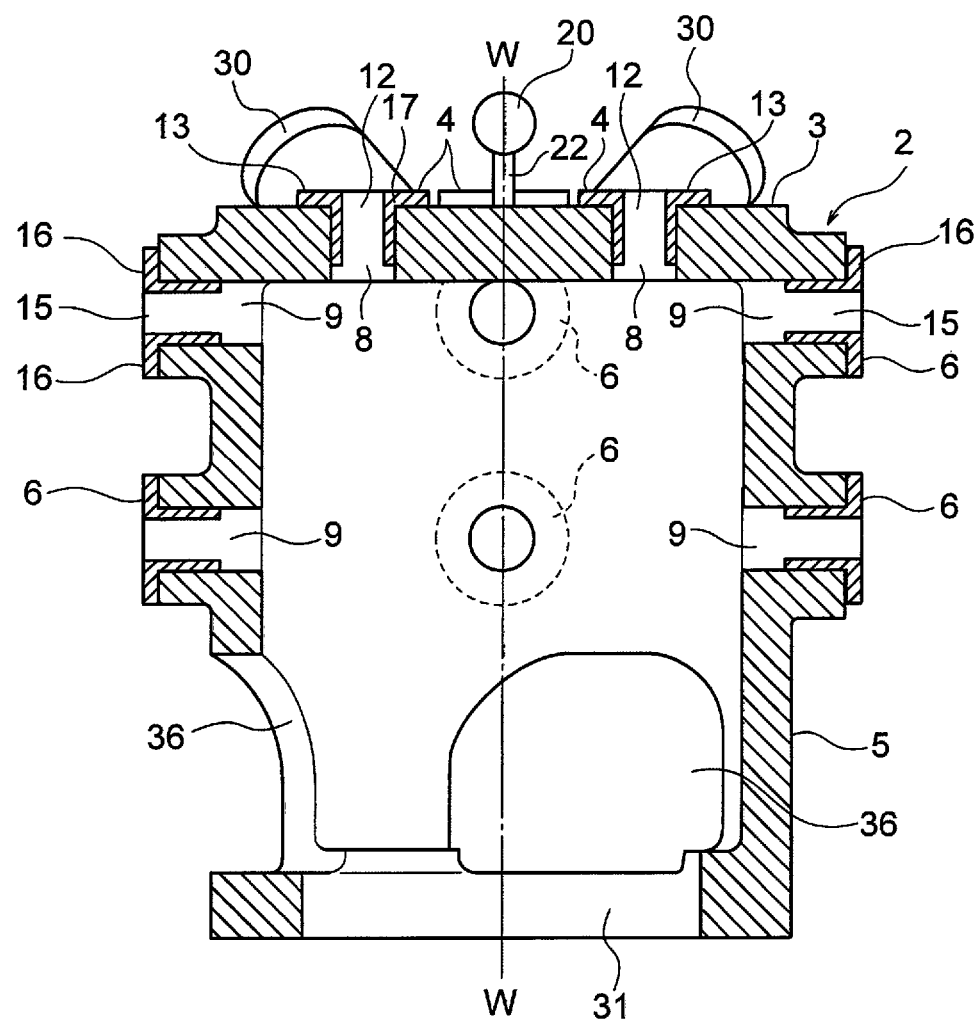
FIG. 7 is a sectional view taken along the line c-c of FIG. 5.
Figure 8:
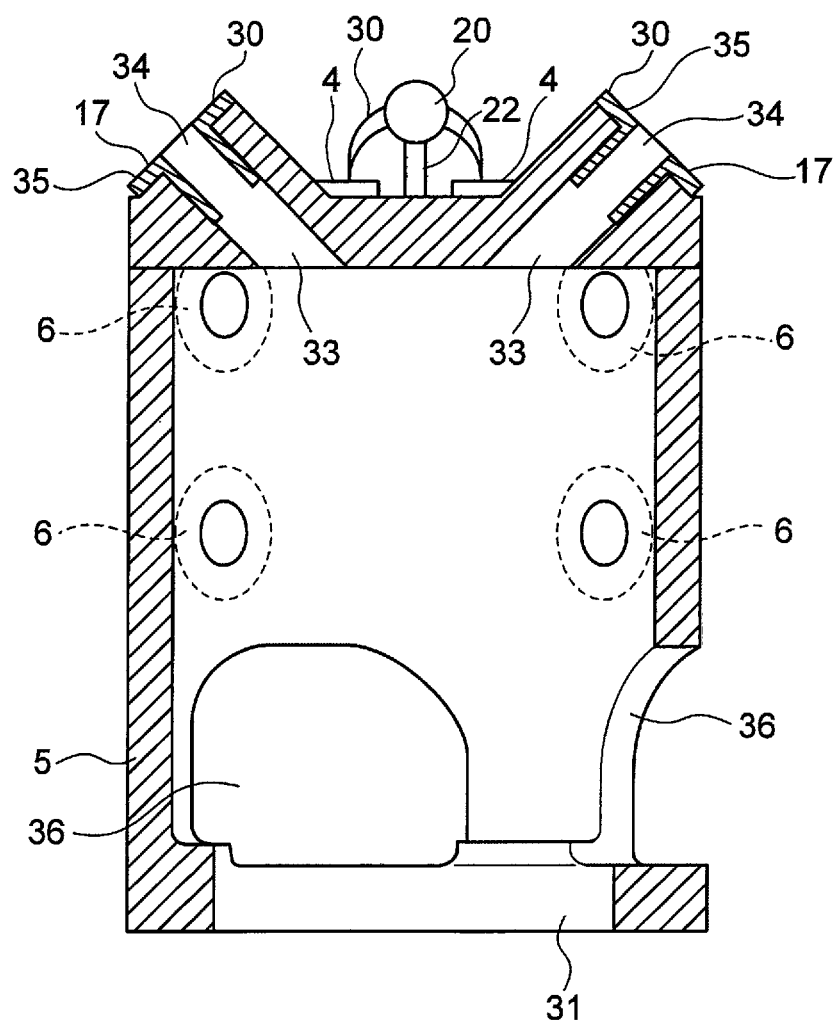
FIG. 8 is a sectional view taken along the line d-d of FIG. 5.
Figure 9:
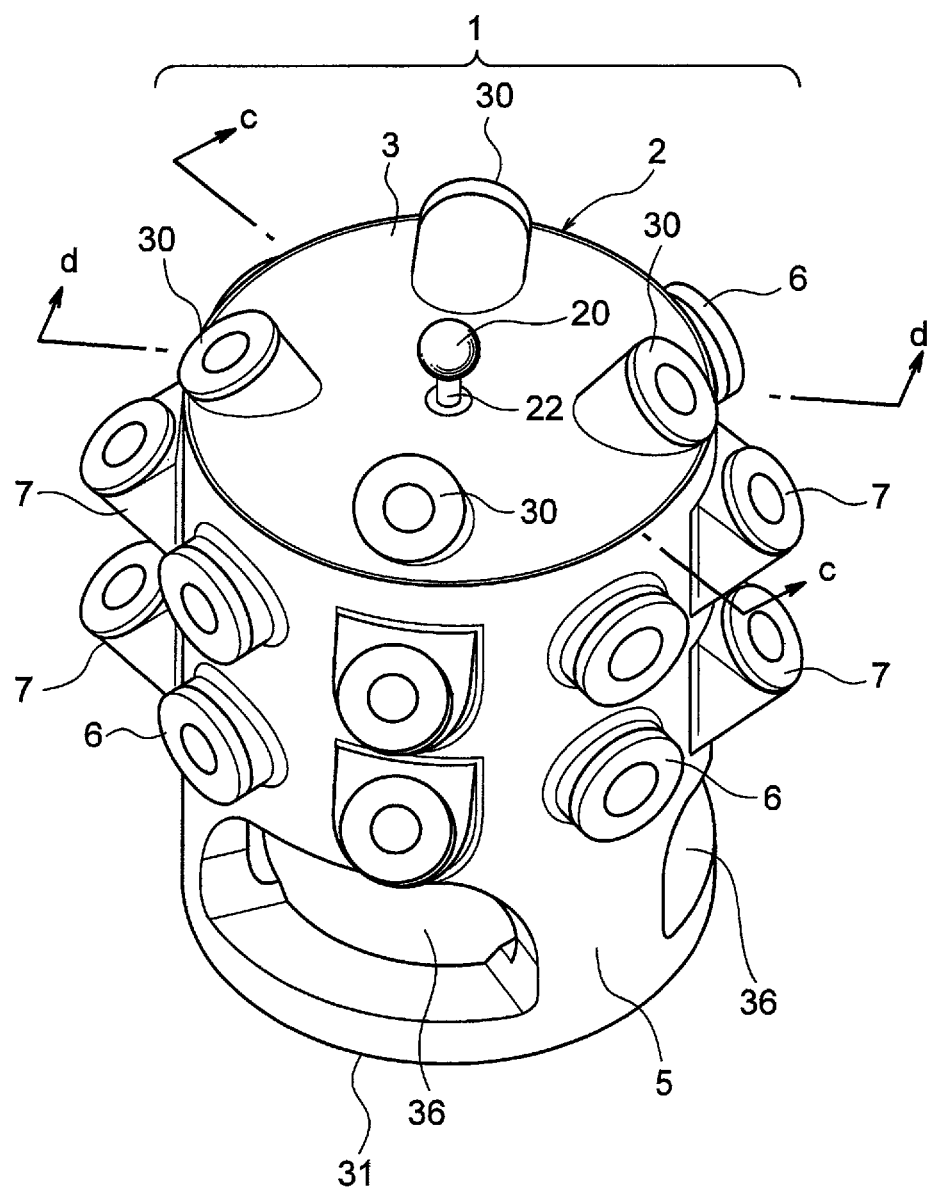
FIG. 9 is a perspective view for illustrating a third example of the inspection master of the present invention.
Figure 10:
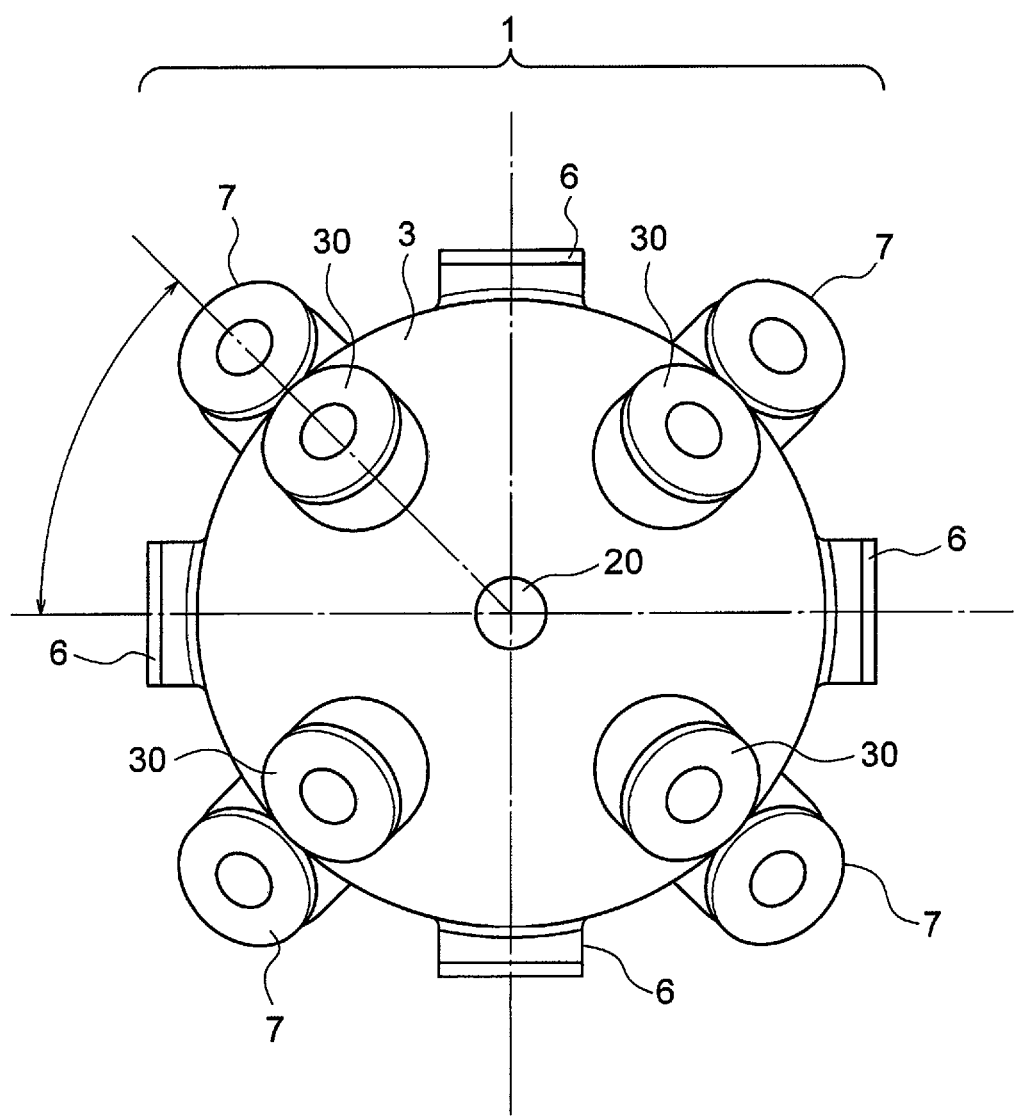
FIG. 10 is a plan view of FIG. 9.
Figure 11:
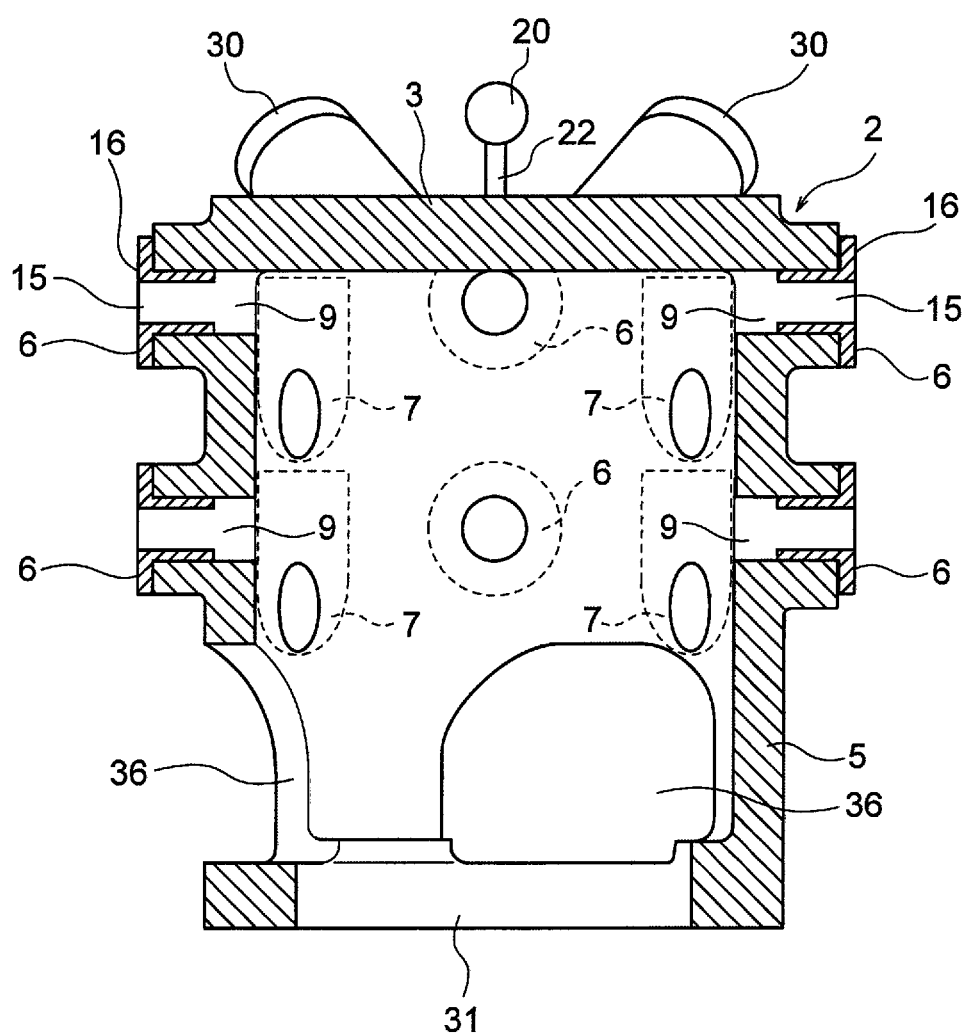
FIG. 11 is a sectional view taken along the line c-c of FIG. 9.
Figure 12:
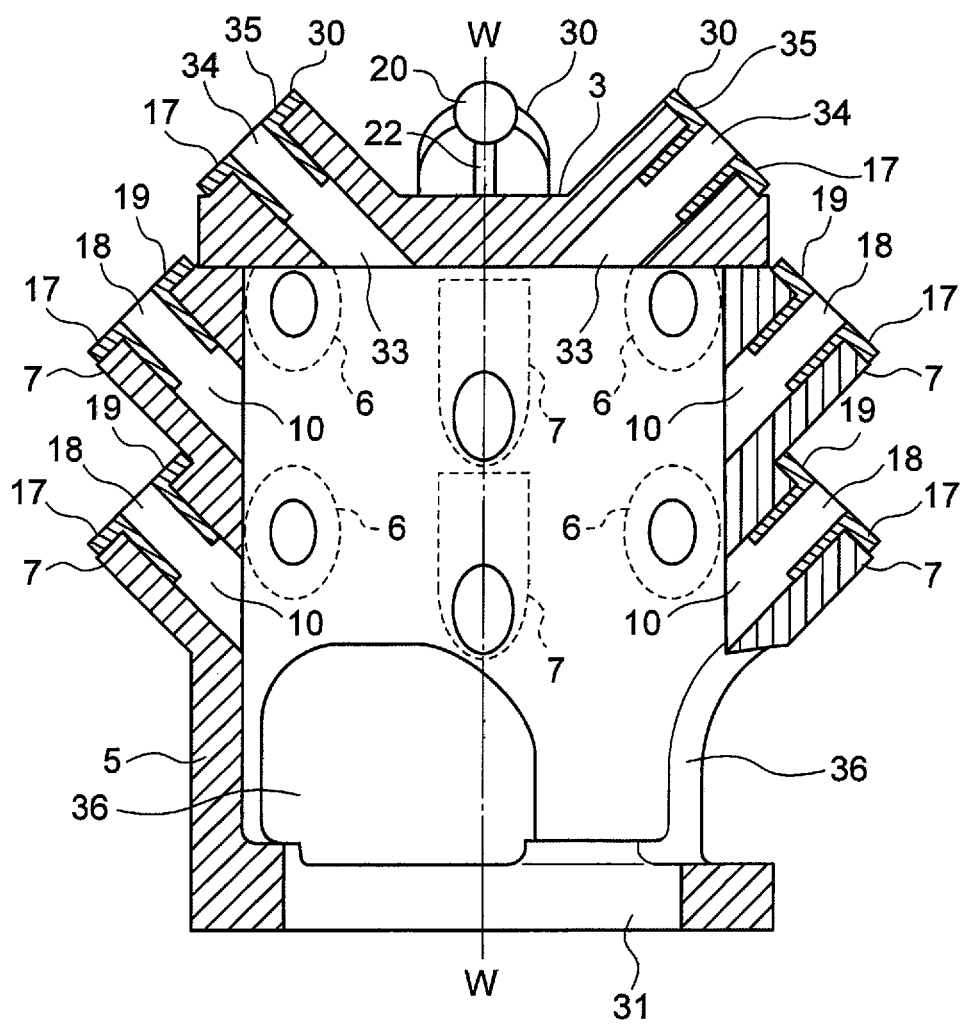
FIG. 12 is a sectional view taken along the line d-d of FIG. 9.
Figure 13:
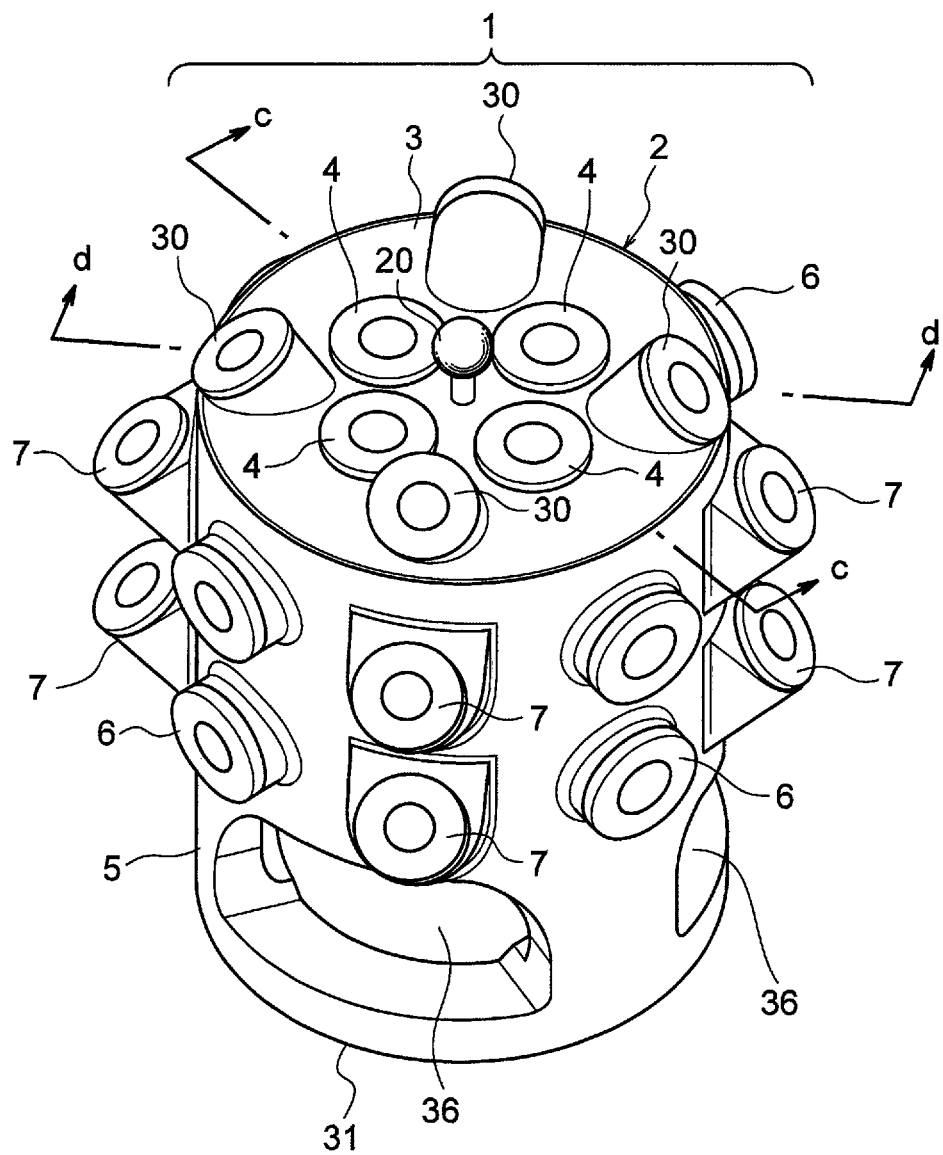
FIG. 13 is a perspective view for illustrating a fourth example of the inspection master of the present invention.
Figure 14:
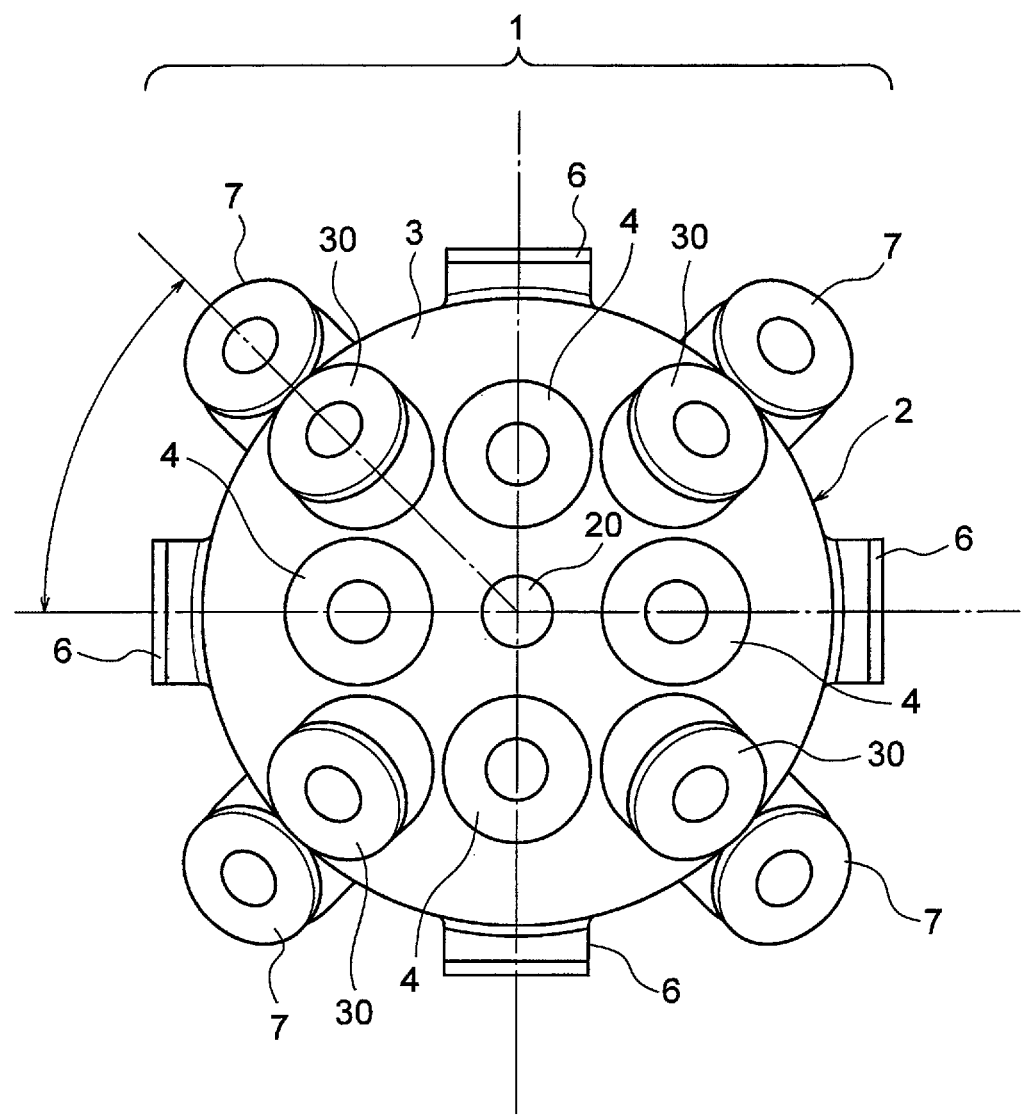
FIG. 14 is a plan view of FIG. 13.
Figure 15:
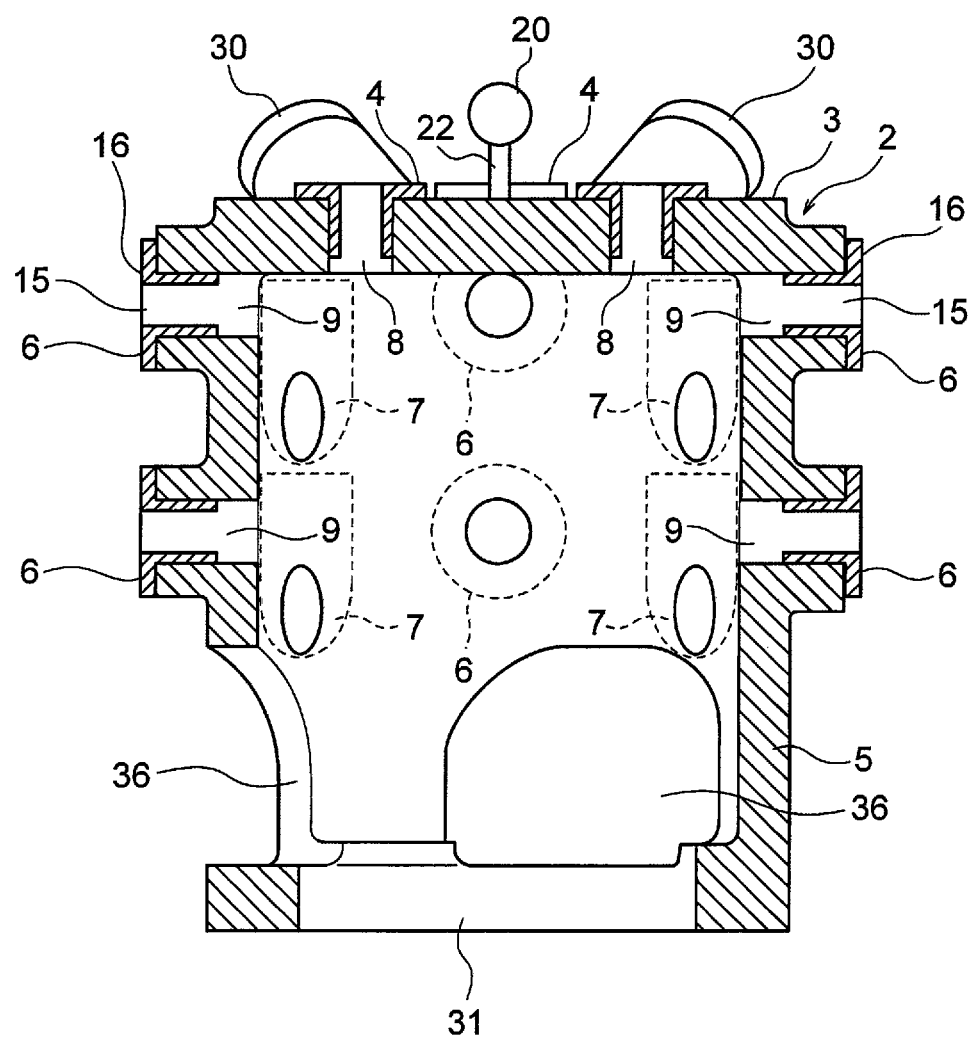
FIG. 15 is a sectional view taken along the line c-c of FIG. 13.
Figure 16:
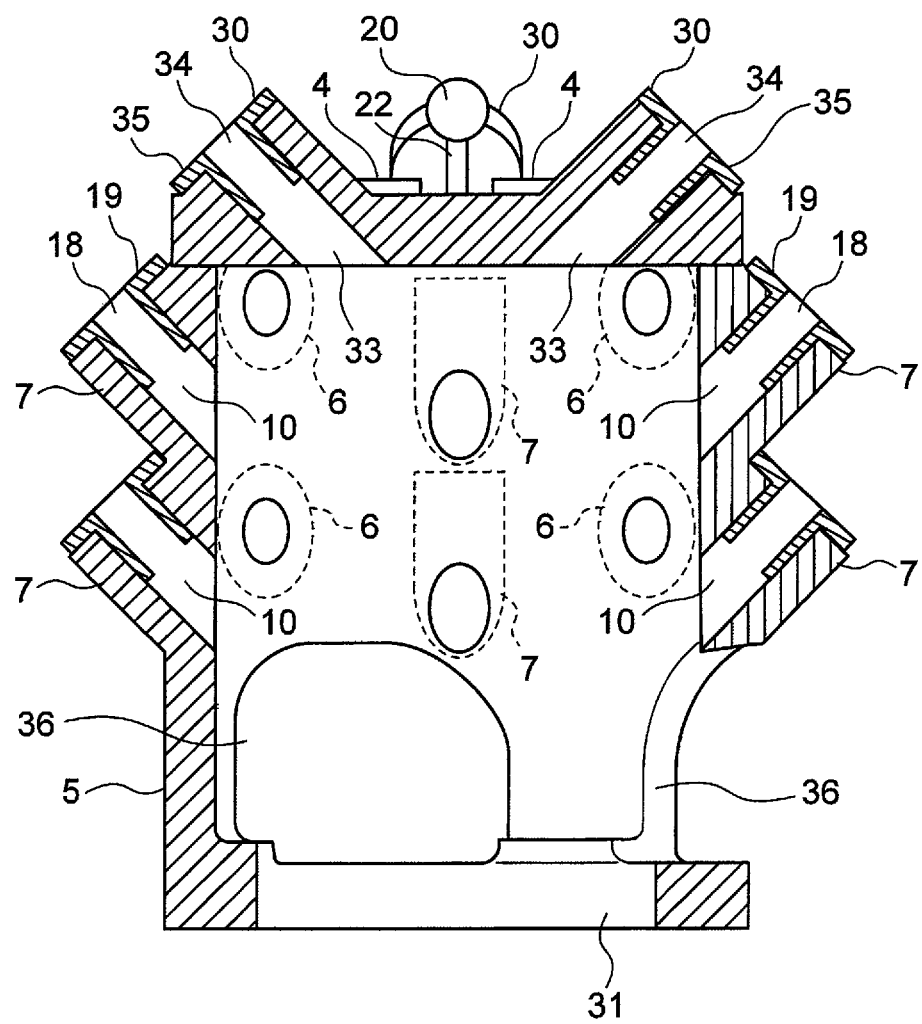
FIG. 16 is a sectional view taken along the line d-d of FIG. 13.

As illustrated in FIG. 1, the master main body 2 in the above-mentioned embodiments includes the upper surface 3 and the peripheral surface 5, and, as illustrated in FIG. 3 and FIG. 4(a), the bottom surface 31 is opened. The master main body 2 has a hollow cylindrical shape (three-dimensional shape) with a hollow inside. As illustrated in FIG. 4(b), the bottom surface 31 may be closed, and a stop hole 32 may be opened in the center portion. In either case, opening portions 36 are opened in a lower portion of an outer peripheral surface of the master main body 2. The master main body 2 can be reduced in weight by providing the opening portions 36, and the opening portions 36 can be used for setting and fixing the inspection master 1 to a measurement table. The number of the illustrated opening portions 36 is three, but may be any number. The size of the opening portions 36 may also be freely selectable, and, as an example, a width of about 65 mm and a height of about 30 mm are suitable. It is suitable that the master main body 2 is made of a material having small thermal expansion and excellent dimensional stability. For example, ceramics, quartz, crystal, low thermal expansion cast iron, SK steel, and other materials are suitable. The master main body 2 may be formed by machining from a single lump (block) of those materials, or may be formed by bonding plate materials made of those materials. The master main bodies 2 of the above-mentioned embodiments are basically the same in shape, structure, and size, but can be designed and changed as necessary. The master main body 2 may have a rectangular hollow cylindrical shape. In this case, a part corresponding to the peripheral surface 5 is flat side surfaces.

The master main body 2 of FIG. 1 to FIG. 4 has upper-surface oblique mounting holes 33 (FIG. 4(a)) opened to the upper surface 3, and peripheral-surface mounting holes 9 (FIG. 3(a)) opened to the peripheral surface 5.

The master main body 2 of FIG. 5 to FIG. 8 has upper-surface oblique mounting holes 33 (FIG. 8) and upper-surface mounting holes 8 (FIG. 7) opened to the upper surface 3, and peripheral-surface mounting holes 9 (FIG. 7) opened to the peripheral surface 5.

The master main body 2 of FIG. 9 to FIG. 12 has upper-surface oblique mounting holes 33 (FIG. 12) opened to the upper surface 3, and peripheral-surface mounting holes 9 (FIG. 11) and peripheral-surface oblique mounting holes 10 (FIG. 12) opened to the peripheral surface 5.

The master main body 2 of FIG. 13 to FIG. 16 has upper-surface oblique mounting holes 33 (FIG. 16) and upper-surface mounting holes 8 (FIG. 15) opened to the upper surface 3, and peripheral-surface mounting holes 9 (FIG. 15) and peripheral-surface oblique mounting holes 10 (FIG. 16) opened to the peripheral surface 5.

[Upper-Surface Oblique Reference Portions]

The upper-surface oblique reference portions 30 (FIG. 1) are the same in the above-mentioned embodiments, and a flanged bush 17 (FIG. 3(b)) is inserted into and fixed to each of the upper-surface oblique mounting holes 33 (FIG. 4(a)) of the master main body 2. As illustrated in FIG. 3(b), the flanged bush 17 has a flange 17b at a distal end of a cylindrical insertion portion 17a. A through hole 17c (FIG. 3(b)) of the insertion portion 17a is defined as an oblique reference hole 34 (FIG. 4(a)), and a surface of the flange 17b (FIG. 3(b)) is defined as an oblique measurement reference surface 35 (FIG. 4(a)). The oblique reference hole 34 is opened in a direction crossing a center axis W-W (FIG. 4(a)) of the master main body 2 obliquely at 45° (obliquely upward). An inner peripheral surface of the oblique reference hole 34 and a surface of the oblique measurement reference surface 35 are both smoothly finished. The crossing angle of the oblique reference hole 34 and the center axis W-W (FIG. 4(a)) of the master main body 2 may also be set at any angle, for example, 30° or 60°.

[Peripheral-Surface Lateral Reference Portions]

The peripheral-surface lateral reference portions 6 (FIG. 1 and FIG. 3(a)) arranged in four rows each including two peripheral-surface lateral reference portions 6 on the peripheral surface 5 of the master main body 2 have the same shape, and the flanged bush 17 (FIG. 3(b)) is inserted into and fixed to each of the peripheral-surface mounting holes 9 of the master main body 2. The through hole 17c (FIG. 3(b)) of the flanged bush 17 is defined as a lateral reference hole 15, and a surface of the flange 17b (FIG. 3(b)) of the flanged bush 17 is defined as a lateral measurement reference surface 16. The lateral reference hole 15 is opened in a direction orthogonal to the center axis W-W (FIG. 4(a)) of the master main body 2 (right lateral direction). An inner peripheral surface of the lateral reference hole 15 and a surface of the lateral measurement reference surface 16 are both smoothly finished. The peripheral-surface lateral reference portions 6 in corresponding rows are provided at intervals in four rows each including two peripheral-surface lateral reference portions 6 (FIG. 1(a) and FIG. 2), but the number of rows, the number in each row, and the intervals of the rows of the peripheral-surface lateral reference portions 6 can be suitably designed.

[Upper-surface Vertical Reference Portions]

The four upper-surface vertical reference portions 4 (FIG. 5) of the master main body 2 are arranged and fixed on the inner side of the upper-surface oblique reference portions 30 and on an outer side of the reference ball 20. The upper-surface vertical reference portions 4 are fixed by inserting the flanged bushes 17 (FIG. 3(b)) into the upper-surface mounting holes 8 (FIG. 7) of the master main body 2. The through hole 17c (FIG. 3(b)) of the flanged bush 17 is defined as a vertical reference hole 12, and the surface of the flange 17b (FIG. 3(b)) of the flanged bush 17 is defined as an upper measurement reference surface 13. The vertical reference hole 12 is opened in parallel to the center axis W-W (FIG. 7) of the master main body 2. An inner peripheral surface of the vertical reference hole 12 and a surface of the upper measurement reference surface 13 are both smoothly finished. The number and the interval of the upper-surface vertical reference portions 4 can be suitably designed.

[Peripheral-surface Oblique Reference Portions]

In the peripheral-surface oblique reference portions 7 (FIG. 9) arranged in four rows each including two peripheral-surface oblique reference portions 7 on the peripheral surface 5 of the master main body 2, the flanged bush 17 (FIG. 3(b)) is inserted into and fixed to each of the peripheral-surface oblique mounting holes 10 (FIG. 12) of the master main body 2. The through hole 17c (FIG. 3(b)) of the flanged bush 17 is defined as an oblique reference hole 18, and the surface of the flange 17b (FIG. 3(b)) of the flanged bush 17 is defined as an oblique measurement reference surface 19. The oblique reference hole 18 is opened in a direction crossing the center axis W-W (FIG. 12) of the master main body 2 obliquely at 45° (obliquely upward). An inner peripheral surface of the oblique reference hole 18 and a surface of the oblique measurement reference surface 19 are both smoothly finished. The peripheral-surface oblique reference portions 7 in respective rows are provided at intervals in four rows each including two peripheral-surface oblique reference portions 7 (FIG. 9 and FIG. 10), but the number of rows, the number in each row, and the intervals of the rows of the peripheral-surface oblique reference portions 7 can be suitably designed. The crossing angle of the oblique reference hole 18 and the center axis W-W (FIG. 12) of the master main body 2 may be set at any angle, for example, 30° or 60°.

[Flanged Bush]

An existing (commercially available) flanged bush and a new flanged bush can both be used for the flanged bush 17 (FIG. 3(b)). The flanged bush 17 is made of a material such as low thermal expansion cast iron having a low thermal expansion coefficient, and it is desired that the surface of the flange 17b and an inner peripheral surface of the through hole 17c be mirror-finished with high accuracy. The finishing work can be performed both before and after each flanged bush 17 is fixed to the master main body 2. When the finishing work is performed after the fixing, accuracy of a mounting angle and a mounting position with respect to the master main body 2 can be improved.

[Fixing Flanged Bush]

Fixing the flanged bush 17 to each of the mounting hole can be optional means, and the flanged bush 17 can be bonded and fixed with Loctite (trademark) or other adhesives. Caulking, screwing, and other fixing means can be used as necessary.

In the illustrated embodiments, the master main body 2 and the flanged bushes 17 are formed separately, and those flanged bushes 17 are inserted into and fixed to the upper-surface mounting holes 8, the peripheral-surface mounting holes 9, the peripheral-surface oblique mounting holes 10, the upper-surface oblique mounting holes 33 of the master main body 2, respectively. However, if possible, the master main body 2 and the flanged bushes 17 may be formed integrally.

[Reference Ball]

Figure 1B:
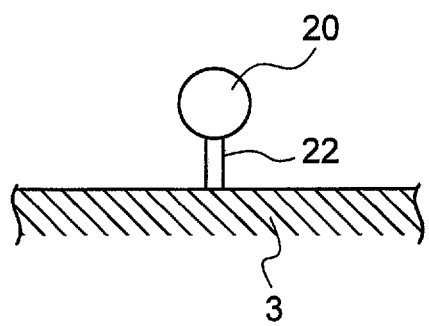
FIG. 1(b) is an explanatory view for illustrating a case in which a reference ball is mounted on a shaft.
Figure 2:
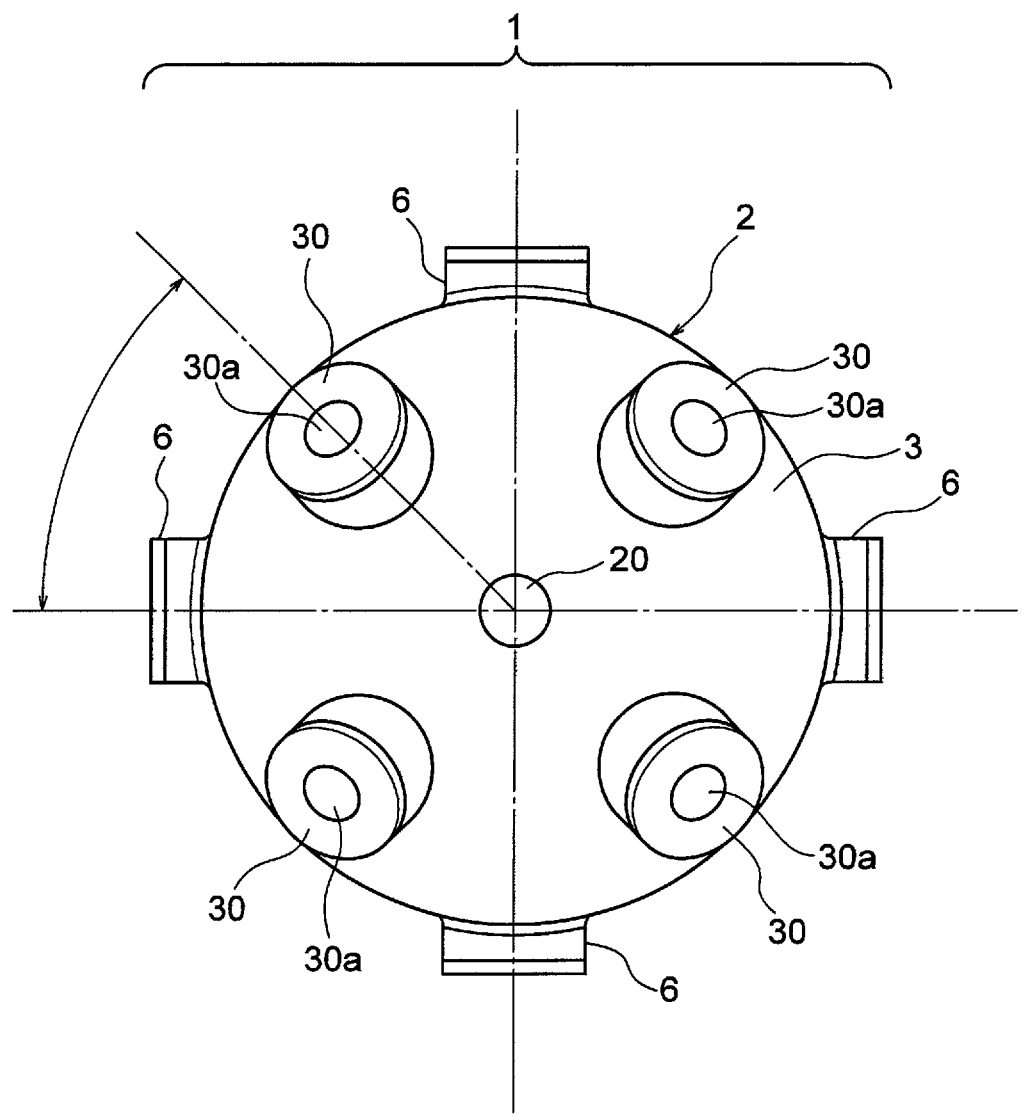
FIG. 2 is a plan view of FIG. 1(a).
Figure 17A:
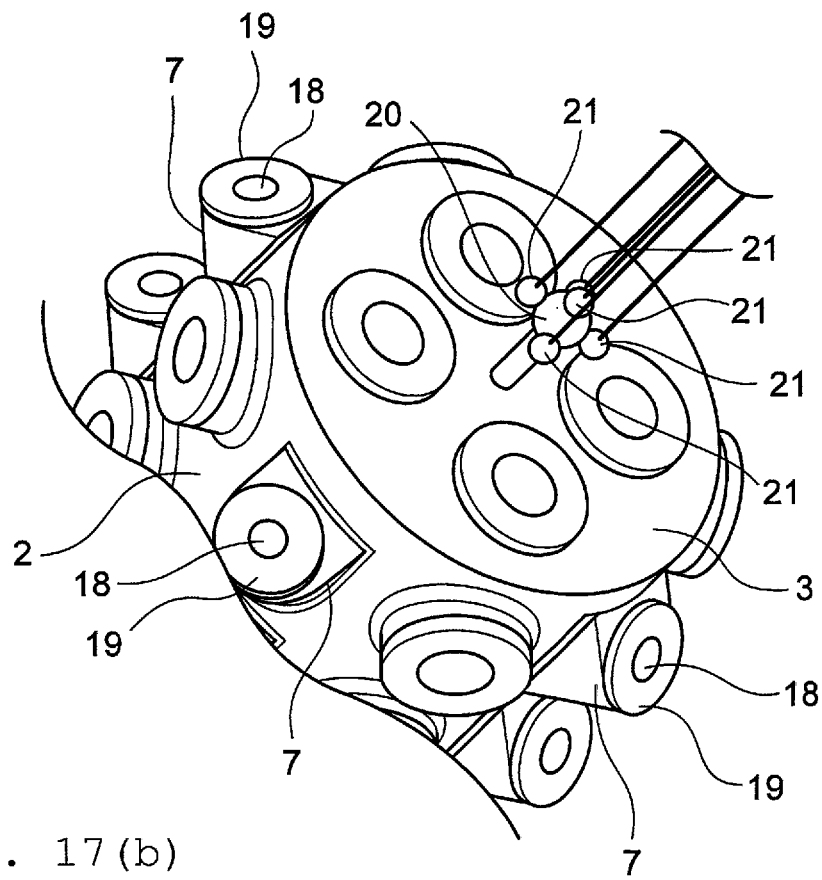
FIG. 17(a) is an explanatory perspective view for illustrating a central coordinate measuring method for a reference ball.

As illustrated in FIG. 1(b), the reference ball 20 provided at the center of the upper surface 3 of the master main body 2 is mounted in such a manner as to protrude upward from the upper surface 3 of the master main body 2 with the shaft 22 (to be away from the upper surface). The reference ball 20 is mounted in this way, and hence the spherical measurement probes 21 (FIG. 17) for measurement are easily brought into contact with the reference ball 20. When five-axis measurement is to be performed on a five-axis processing machine with use of the inspection master 1 of the present invention, as described later, the inspection master 1 is set on a holder of the measurement table (not shown), and the reference ball 20 is inclined as illustrated in FIG. 17(a) through rotation or turning of the holder. The reference ball 20 serves as a reference for checking an inclination angle of the inspection master 1.

Usage Example 1

When inspection for a contact type three-dimensional measuring machine is to be performed with use of the inspection master 1 of the present invention, similarly to the related-art three-dimensional measurement, the inspection master 1 of the present invention is set on the holder, and a probe of the contact type three-dimensional measuring machine is moved in three-axis directions of X, Y, and Z so as to be brought into contact with the upper-surface vertical reference portions 4 and the peripheral-surface lateral reference portions 6 of the inspection master.

Usage Example 2

When five-axis measurement is to be performed on the five-axis processing machine with use of the inspection master 1 of the present invention, for example, a measurement head and the spherical measurement probes 21 (FIG. 17(a)) are set to the five-axis processing machine in place of a machining tool of the five-axis processing machine, and the inspection master 1 of the present invention is set on a holder that can rotate or turn or can both rotate and turn. Under this state, the measurement probes 21 are moved in the three-axis directions of X, Y, and Z to perform three-dimensional measurement. Further, the holder is rotated or turned, or rotated and turned to incline the inspection master 1 set on the holder with respect to the measurement probes 21 (FIG. 17(a)).

Under the inclined state, the measurement probes 21 are brought into contact with the inner peripheral surface of the oblique reference hole 18 (34) or the oblique measurement reference surface 19 (35) of any of the peripheral-surface oblique reference portions 7 and the upper-surface oblique reference portions 30 of the inspection master 1 of the present invention, and measurement of necessary items such as smoothness and inclination angles of the contact points (five-axis measurement in total including the three-axis measurement) is performed. Those measured values (actual measured values) are compared with reference values in which metric traceability is confirmed to check an error between the actual measured values and the reference values and check straightness of each axial direction in which the measurement probes 21 move, squareness between the axes, a display error in each axial direction, and an inter-hole distance. In this manner, evaluation of the measurement machine itself can be performed. When there is an error, the measurement machine or the processing machine can be adjusted so that the error is eliminated.

Figure 17B:
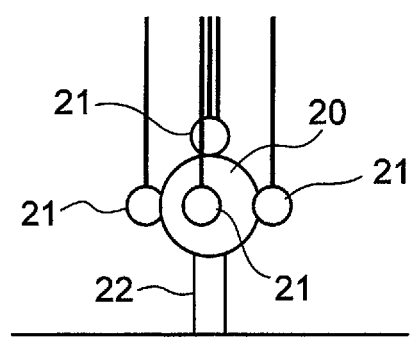
FIG. 17(b) is an explanatory side view for illustrating the measuring method.
Figure 17C:
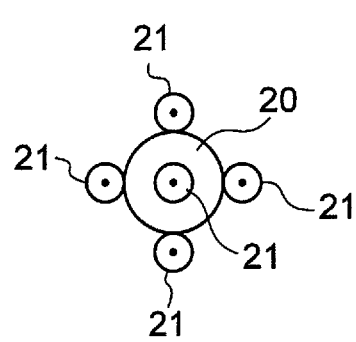
FIG. 17(c) is an explanatory plan view for illustrating the measuring method.
Figure 18:
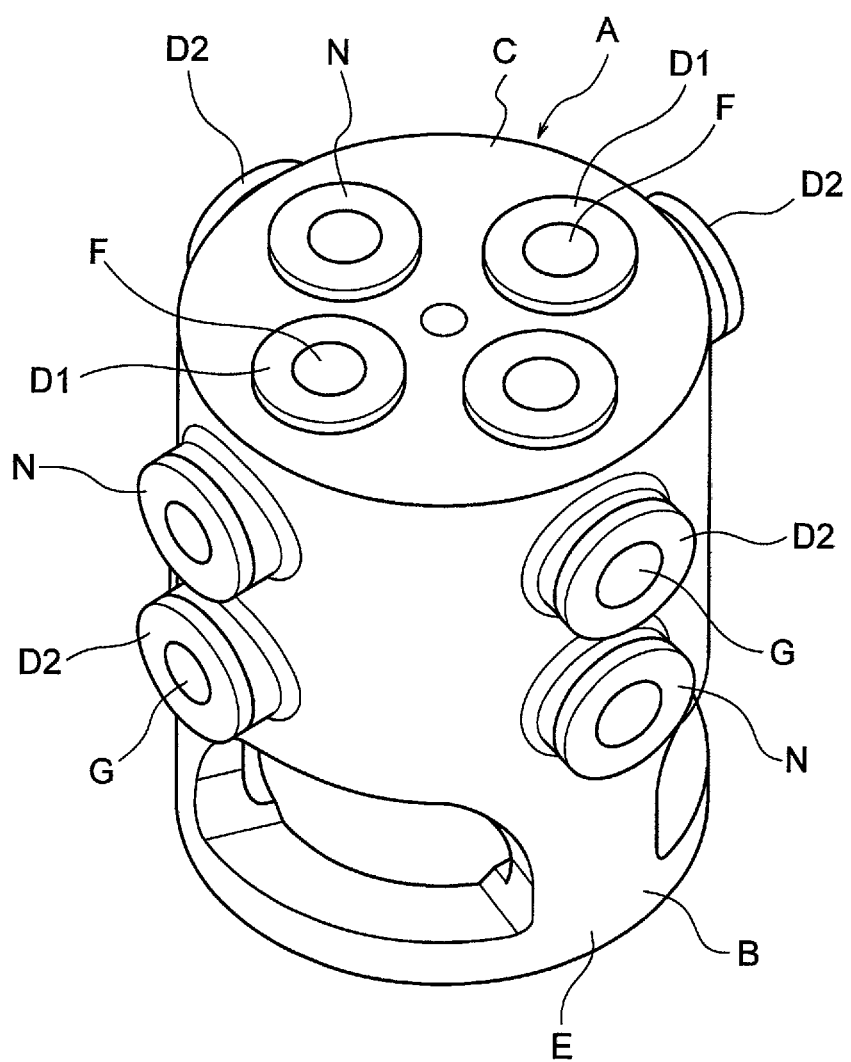
FIG. 18 is a perspective view of an inspection master previously developed by the applicant of the subject application.
Figure 19:
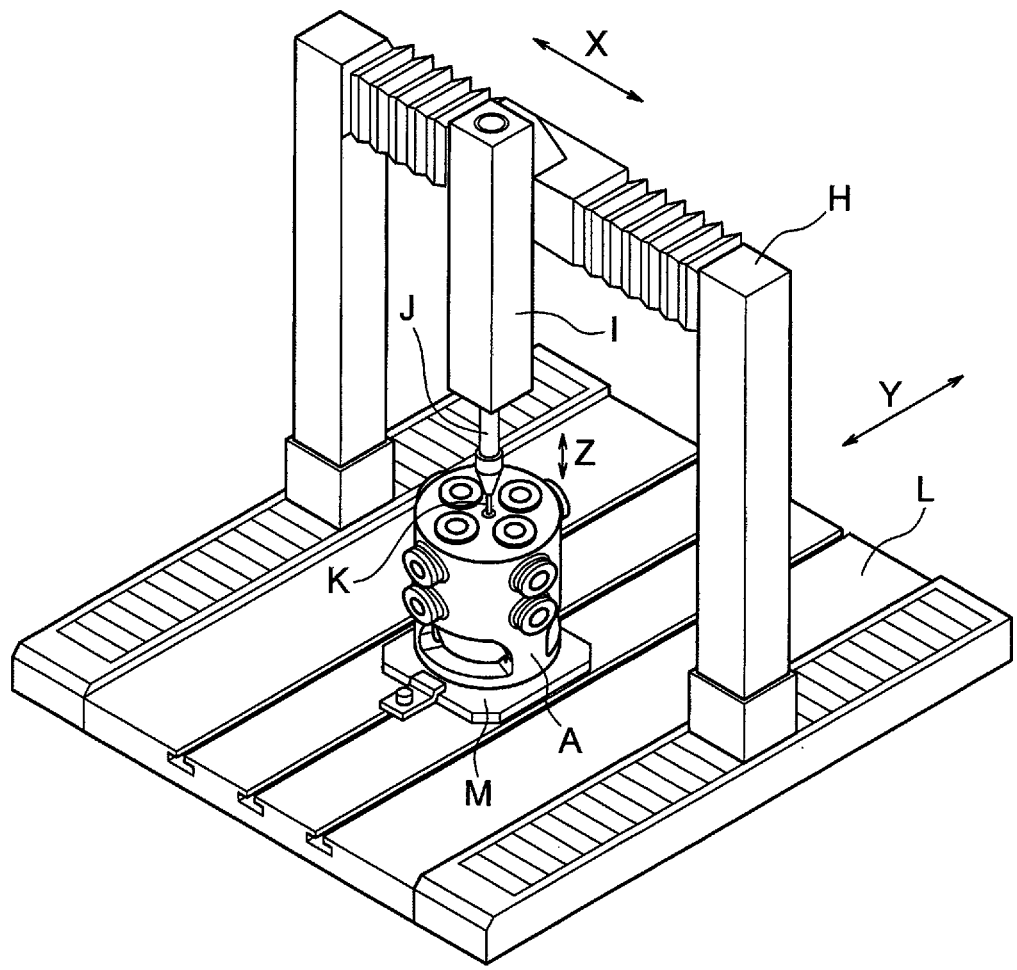
FIG. 19 is an explanatory view for illustrating a case of measuring a contact type three-dimensional measuring machine of a gantry type with use of the inspection master of FIG. 18.

In the five-axis measurement, the inspection master 1 is inclined, and hence it is required to check the inclination angle. In this case, the inclination angle can be checked with use of the reference ball 20. As an example of the checking method, as illustrated in FIG. 17(a) to FIG. 17(c), outer peripheral surfaces (top portions) of the spherical measurement probes 21 are brought into contact with the reference ball 20 at five portions in total, specifically, the four top portions at front, rear, left, and right positions and an upper top portion on the outer peripheral surface of the reference ball 20 to obtain a central coordinate of the reference ball 20. The coordinate value is compared with a reference coordinate value to obtain an inclination of the inspection master 1 based on a difference between both the coordinates. The reference coordinate value can be a central coordinate of the reference ball 20 when the upper surface of the inspection master 1 set on the holder is horizontal. When the reference coordinate value is to be obtained, similarly to the case described above, the outer peripheral surfaces (top portions) of the spherical measurement probes 21 are brought into contact with the reference ball 20 at five portions in total, specifically, the four top portions at front, rear, left, and right positions and the upper top portion on the outer peripheral surface of the reference ball 20 to obtain a central coordinate of the reference ball 20. When an inclination angle of the peripheral-surface oblique reference portion 7 is, for example, 45°, it is checked whether or not the inspection master is inclined exactly at 45°, and the holder can be rotated or turned to adjust the inspection master 1 to an angle of 45° exactly. In the present invention, the inclination of the inspection master 1 is adjusted to a predetermined angle in advance, and the spherical measurement probes 21 are brought into contact with the oblique reference hole 18 or the oblique measurement reference surface 19 of the peripheral-surface oblique reference portion 7 to measure, for example, the smoothness and the angle between the axes of those measured points, thereby enabling accurate five-axis measurement. Accurate five-axis measurement is enabled also when the spherical measurement probes 21 are brought into contact with the oblique reference hole 34 or the oblique measurement reference surface 35 of the upper-surface oblique reference portion 30 to measure, for example, the smoothness and the angle between the axes of those measured points. The method for obtaining the inclination angle may be other methods. The measurement probes 21 may be articulated arm probes or probes having other configurations.

Other Embodiment

The inspection master 1 of the present invention is not limited to the above-mentioned embodiments, and other configurations, dimensions, materials, and the like can be adopted as long as the problem of the present invention can be solved.

The installation numbers, the installation positions, and the like of the upper-surface vertical reference portions 4, the upper-surface oblique reference portions 30, the peripheral-surface lateral reference portions 6, and the peripheral-surface oblique reference portions 7 can be suitably designed. For example, as long as the measurement is possible, the upper-surface oblique reference portions 30 may not be inclined outward toward the outer circumferential direction of the master main body 2, but may be inclined inward toward the center side of the master main body 2. The master main body 2 may not be a cylindrical shape, but may be a rectangular shape, a polygonal box shape, or any other shape.

REFERENCE SIGNS LIST 1 inspection master
2 master main body
3 upper surface (of master main body)
4 upper-surface vertical reference portion
5 peripheral surface (of master main body)
6 peripheral-surface lateral reference portion
6a lateral opening hole
7 peripheral-surface oblique reference portion
8 upper-surface mounting hole
9 peripheral-surface mounting hole
10 peripheral-surface oblique mounting hole
12 vertical reference hole
13 upper measurement reference surface
15 lateral reference hole
16 lateral measurement reference surface
17 flanged bush
17a insertion portion (of flanged bush)
17b flange (of flanged bush)
17c through hole (of flanged bush)
18 oblique reference hole
19 oblique measurement reference surface
20 reference ball
21 measurement probe
22 shaft
30 upper-surface oblique reference portion
30a upper opening hole
31 bottom surface
32 stop hole
33 upper-surface oblique mounting hole
34 oblique reference hole 35 oblique measurement reference surface
36 opening portion
A inspection master
B master main body
C upper surface (of master main body)
D1 upper-surface measurement portion
D2 peripheral-surface measurement portion
E peripheral surface (of master main body)
F reference hole (vertical hole)
G reference hole (lateral hole)
H gantry-type movable frame
I head portion
J elevation shaft
K probe
L measurement table
M holder
N measurement reference surface

The invention claimed is:

1. An inspection master, comprising both or any one of an upper-surface oblique reference portion and a peripheral-surface oblique reference portion provided on a hollow cylindrical master main body including a peripheral surface and an upper surface,
- wherein the upper-surface oblique reference portion is provided on the upper surface of the master main body,
- wherein the peripheral-surface oblique reference portion is provided on the peripheral surface of the master main body,
- wherein the upper-surface oblique reference portion has an oblique reference hole opened obliquely upward with respect to the upper surface of the master main body,
- wherein the peripheral-surface oblique reference portion has an oblique reference hole opened obliquely upward with respect to the peripheral surface of the master main body, and
- wherein a reference ball configured to check an inclination angle of the master main body is provided on the upper surface of the master main body.

2. The inspection master according to claim 1,
- wherein both or any one of an upper-surface vertical reference portion and a peripheral-surface lateral reference portion is provided on the master main body,
- wherein the upper-surface vertical reference portion has a vertical reference hole opened vertically on the upper surface of the master main body, and
- wherein the peripheral-surface lateral reference portion has a lateral reference hole opened laterally on the peripheral surface of the master main body.

3. The inspection master according to claim 1,
- wherein the upper-surface oblique reference portions are provided at two or more positions on the upper surface of the master main body, and
- wherein the peripheral-surface oblique reference portions are provided at two or more positions on the peripheral surface of the master main body.

4. The inspection master according to claim 1,
- wherein the peripheral-surface oblique reference portions are provided at two or more positions in a circumferential direction on the peripheral surface of the master main body.

5. The inspection master according to claim 1, wherein the peripheral-surface oblique reference portions are arranged in two or more rows each including two or more peripheral-surface oblique reference portions arranged in a vertical line on the peripheral surface of the master main body.

6. The inspection master according to claim 1, wherein the reference ball is away from the upper surface of the master main body or is in contact with the upper surface.

* * * * *